UNITED STATES PATENT OFFICE.

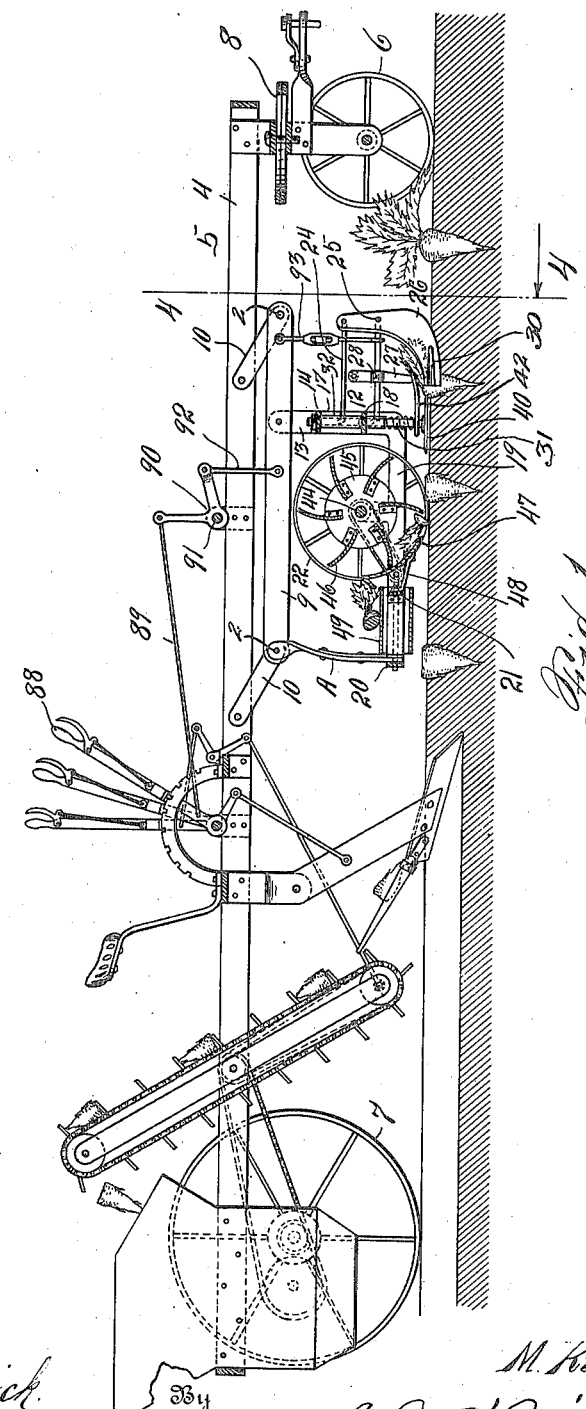

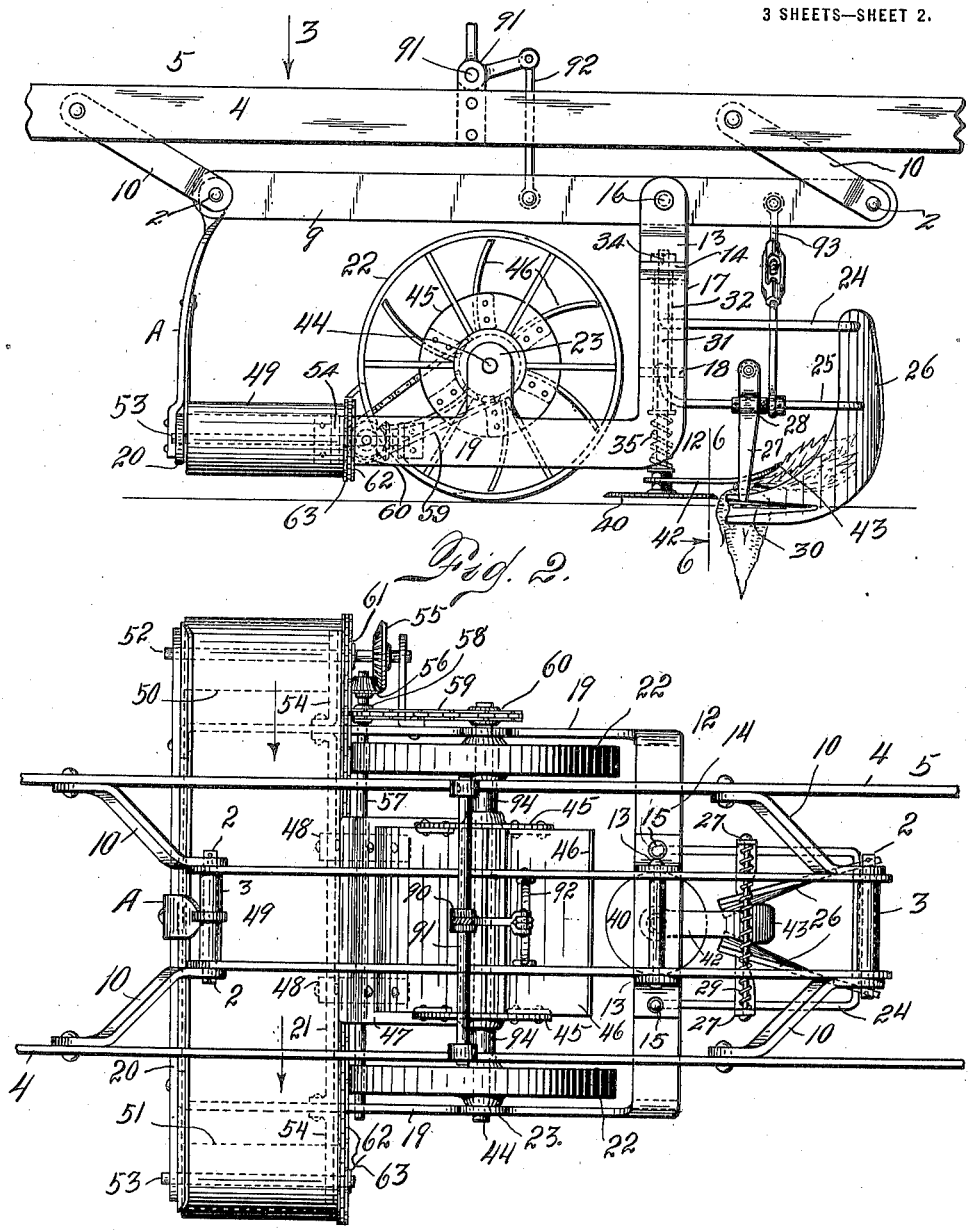

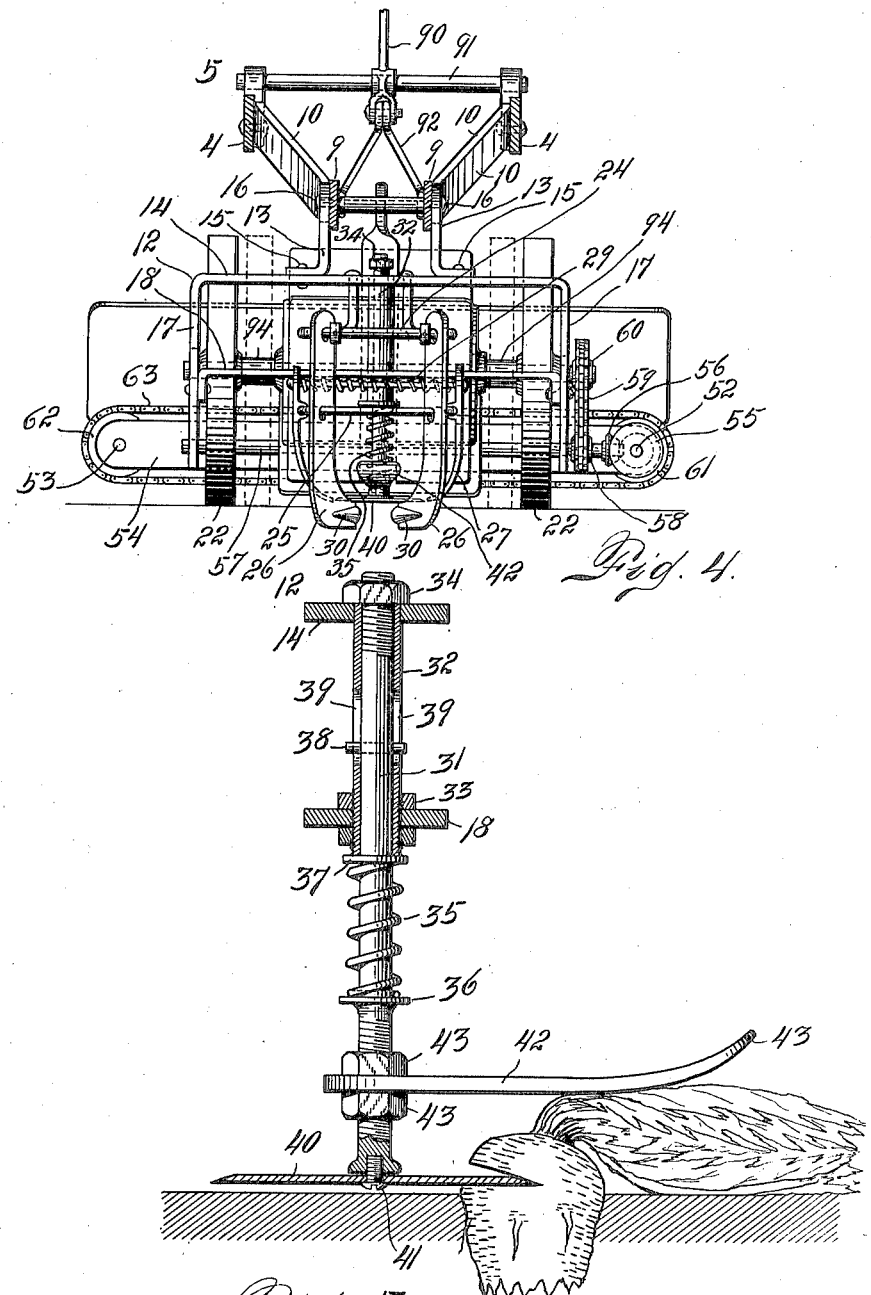

MASAO KUKY, OF EATON, COLORADO.

BEET-HARVESTER.

1,283,810.   Specification of Letters Patent.   Patented Nov. 5, 1918.

Application filed May 26, 1916. Serial No. 100,025.

*To all whom it may concern:*

Be it known that I, MASAO KUKY, a subject of the Emperor of Japan, residing at Eaton, county of Weld, and State of Colorado, have invented certain new and useful Improvements in Beet-Harvesters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in beet harvesters or machines adapted for harvesting sugar beets and all similar vegetables whose roots are below the surface of the ground and whose tops extend above the same.

My object is to provide a machine of this character which shall efficiently perform the topping function so far as vegetables of this class are concerned; and as the invention is especially valuable for use in connection with sugar beets which are more extensively grown that any other of the class indicated, this specification will for convenience, be more particularly directed to the use of the machine with sugar beets, though it must of course, be understood that it may be employed to equal advantage in harvesting similar vegetables of all kinds.

Having briefly outlined my improved construction, I will proceed to describe the same in detail, reference being made to the accompanying drawing, in which is illustrated an embodiment thereof. In this drawing,—

Figure 1 is a central longitudinal section taken vertically through the machine.

Fig. 2 is a detail side view in elevation, of an auxiliary frame, which supports the ground loosening and top-removing mechanisms.

Fig. 3 is a top plan view of the same.

Fig. 4 is a cross section taken on the line 4—4, Fig. 1, looking in the direction of the arrow.

Fig. 5 is an enlarged view of the cutting disk and guide finger.

The same reference characters indicate the same parts in all the views.

Let the numeral 5 designate the main framework of the machine which is supported upon front and rear ground wheels 6 and 7 respectively, the front wheels 6 being controlled by a guide wheel 8 of usual construction. Suitable means are also employed for attaching a tongue and double-trees to the forward extremity of the machine.

Pivotally connected with the side beams 4 of the frame 5 are two pairs of short levers 10, the latter being also pivotally connected with and supporting two bars 9 from which the topping and ground-loosening mechanisms are suspended. The connections between the levers 10 and the bars 9 are formed by means of shafts 2, and the said bars 9 are properly spaced by means of sleeves 3. The topping and ground loosening mechanisms will now be described in detail. An auxiliary frame member 12 is secured to the horizontal bars 9 by means of angle plates 13, the latter being attached to the portion 14 of the frame 12 as shown at 15, and to the bars 9 as shown at 16. The vertical portions 17 of the frame 12 are connected by a cross piece 18, and the lower or horizontally disposed parts 19 of the said frame are connected by cross pieces 20 and 21, the cross piece 20 being connected with the bars 9 by an arm A. The auxiliary frame 12 while being suspended from the main frame 5, is also supported by wheels 22 mounted upon a shaft 44 which is journaled in upwardly projecting portions 23 of the parts 19.

The extremities of U-shaped rods 24 and 25 are respectively secured to the top part 14 of the frame 12 and to the cross piece 18, and their forward portions are adapted to pivotally support ground loosening blades 26 whose lower extremities are free and adapted to bear into the surface over which the machine is traveling. Two spring fingers 27 are pivotally mounted upon the U-shaped rod 25 as shown at 28, and their lower extremities engage exteriorly the lower rear ends of the ground loosening blades 26. The upper extremities of the fingers 27 are connected by a rod loosely journaled therein and a spiral spring 29 is mounted upon the rod between the said fingers, the spring forcing the upper extremities of the latter outwardly, whereby their lower extremities are maintained in engagement with the lower portion of the blades 26 for securing the latter under yielding pressure in the position disclosed in Fig. 4. A part of the lower portion of each blade 26 is bent inwardly forming a tapered coneshaped portion 30, which portions loosen the dirt directly in front of the beet whereby no resistance is offered to the cutting disk hereinafter referred to.

In the rear of the blades 26 is located a post 31 which is slidably mounted in a sleeve 32, the latter being rigidly supported by the upper part 14 of the frame 12 and the cross piece 18. Lock nuts 33 are applied to the sleeve 32 above and below the cross piece 18 for further securing the said sleeve in place. The upper extremity of the post 31 is adapted to project above the sleeve, and is threaded to receive a nut 34, whereby the position of the post may be raised or lowered as desired. The nut 34 will normally be held tightly against the upper end of the sleeve 32 by virtue of a spiral spring 35 which surrounds the post below the sleeve, its lower extremity engaging an annular flange 36 formed upon the post, and its upper extremity engaging a washer 37 which bears against the lower end of the sleeve 32. The post 31 is also provided with a pin 38, the extremities of which project through elongated slots 39 formed in the said sleeve, whereby the post is prevented from turning within the sleeve, and its upward and downward movement limited. To the lower end of the post 31 is secured a cutting disk 40 by means of a screw 41, there being sufficient space between the head of the screw and the base of the post to permit the said cutting disk to revolve freely, whereby the entire cutting edge of the same may be utilized.

A guide finger 42 is adjustably mounted upon the lower portion of the post 31 by means of nuts 43, this portion of the post being threaded for the purpose, and the point at which the beet will be topped is determined by the position of this finger, since, when the latter rides over the foliage of the beet it will automatically raise the post 31 and likewise the cutting disk 40 to the proper position for severing the top of the beet.

Rigidly secured upon the shaft 44 (this being the same shaft upon which the wheels 22 are mounted) between the side beams 4 of the main frame, are spaced hub plates 45, and these hub plates are connected by a series of circumferentially arranged blades 46 adapted to catch the tops of the beets and direct them onto a curved plate 47 which is secured to the bar 21 by means of angle plates 48. The beet tops will pass over the top of the plate 47 and fall upon an endless carrier 49 which will discharge them at one side of the machine. This carrier is mounted upon rollers 50 and 51 secured upon shafts 52 and 53 respectively, the said shafts being journaled in the outer extremities of the bar 20 and angle bars 54, the latter being secured to the parts 19.

Motion is imparted to the carrier 49 by means of a gear 55 secured upon one extremity of the shaft 52, said gear 55 meshing with a gear 56 secured upon one extremity of a shaft 57 which is journaled in the parts 19. A sprocket wheel 58 is mounted upon the shaft 57 adjacent the gear 56, and is connected by a chain 59 with a sprocket wheel 60 secured upon one extremity of the shaft 44. Sprocket wheels 61 and 62 are secured upon the shafts 52 and 53 respectively, and are connected by a chain 63, whereby the travel of the carrier 49 will always be uniform.

Attention is called to the fact that the bars 9 and the mechanism suspended therefrom can be raised or lowered as circumstances require, by means of a lever 88 which has a flexible connection 89 with one arm of a bell crank lever 90 pivoted to the main frame at 91. The other arm of the bell crank lever 90 is pivotally connected with the bars 9 by a rod 92.

Furthermore, if the surface over which the machine is traveling, is too hard to normally allow the ground loosening blades 26 to bear down into the ground, said blades can be forced downwardly into the same by means of rods 93 connecting the bars 9 and the U-shaped rod 25, said rods 93 having a turnbuckle interposed between their extremities.

From the foregoing description the use and operation of my machine will be readily understood. As the machine passes over the row of beets, the blades 26 will loosen the dirt surrounding the latter and particularly in front thereof and the foliage will be engaged by the guide finger 42 which operation will automatically adjust the cutting disk so that the top of the beet will be severed at the proper point and the dirt loosened to such an extent that no resistance will be offered to the said disk at this point. The tops of the beets will then be caught by the blades 46 and carried upwardly over the plate 47 and allowed to drop upon the carrier 49 from which they will be discharged at one side of the machine.

Having thus described my invention, what I claim is,—

1. A beet harvester including a main frame, an auxiliary frame suspended from the latter, ground loosening blades pivotally connected with the auxiliary frame, a post supported by the latter in the rear of said blades, a guide finger mounted upon the said post and adapted to engage the foliage of the beet, and a knife secured to the lower extremity of the post for severing the top of the beet.

2. A beet harvester including a main frame, an auxiliary frame suspended from the latter, ground loosening blades pivotally connected with the auxiliary frame, a post slidably mounted in the latter in the rear of said blades, a knife secured to the lower extremity of the post, and a guide finger also mounted on the post above said knife.

3. A beet harvester including a main frame, an auxiliary frame suspended from the latter, ground loosening blades pivotally connected with the auxiliary frame, a post slidably mounted in the latter in the rear of said blades, a knife secured to the lower extremity of the post, and a guide finger adjustably mounted on the post above the knife, for the purpose set forth.

4. A beet harvester including a main frame, an auxiliary frame pivotally suspended from the main frame, ground loosening blades pivotally connected with the auxiliary frame, a post supported by the latter in the rear of said blades, a cutting disk secured to the lower extremity of the post, a guide finger also secured to the post above the said disk.

5. A beet harvester including a main frame, an auxiliary frame suspended from the latter, a post slidably mounted in the auxiliary frame, a cutting disk secured to the lower extremity of the post, a guide finger also secured to the post above the said disk, and a spring connection between the auxiliary frame and post, whereby the latter may be raised under tension when the said guide finger engages the foliage of the beet.

6. A machine of the class described, including a main frame, an auxiliary frame suspended from the latter, a sleeve rigidly secured within the auxiliary frame, a post slidably mounted in said sleeve, means for adjusting the position of the post, a cutting disk secured to the lower extremity of the latter, and a guide finger also secured to the said post above the cutting disk, for the purpose set forth.

7. A machine of the class described, including a main frame, an auxiliary frame suspended from the latter, a post slidably mounted in the auxiliary frame, a cutting disk loosely mounted upon the lower extremity of the post, and a guide finger adjustably secured to the said post above the cutting disk and adapted to engage the foliage of the beet, whereby the said disk is adjusted to the proper cutting position.

8. A machine of the class described, including a main frame, a post adjustably suspended from the latter, a cutting disk secured to the lower extremity of the post, and a guide finger adjustably mounted upon the said post above the cutting disk for automatically raising the latter to the proper cutting position.

9. A machine of the class described, including a main frame, an auxiliary frame suspended from the latter, ground loosening blades pivotally connected with the auxiliary frame, the lower extremities of said blades adapted to bear into the ground, and means pivotally connected with the auxiliary frame and engaging said lower extremities for securing them under tension.

10. A machine of the class described, including a main frame, an auxiliary frame suspended from the latter, ground loosening blades pivotally connected with the auxiliary frame, spring fingers also pivotally connected with the auxiliary frame and engaging the lower extremities of said blades, and expansion means applied to said fingers, for the purpose set forth.

11. A machine of the class described, including a main frame, bars suspended from the latter, an auxiliary frame suspended from said bars, ground loosening blades pivotally connected with the auxiliary frame, and an adjustable connection between the bars and ground loosening blades, for the purpose set forth.

12. A machine of the class described, including a main frame, an auxiliary frame suspended from the latter, ground loosening blades pivotally connected with the auxiliary frame and their lower extremities being provided with inwardly projecting portions longitudinally tapered.

13. A beet harvester including a main frame, an auxiliary frame suspended from the latter, a shaft journaled in the auxiliary frame, wheels mounted upon said shaft, hub plates rigidly secured to the latter between the wheels, and blades connecting the said hub plates and projecting beyond the periphery of the latter for picking up the beet tops.

14. A beet harvester including a main frame, an auxiliary frame suspended from the latter, a shaft journaled in the auxiliary frame, wheels mounted upon said shaft, hub plates rigidly secured to the latter between the wheels, and a series of blades connecting the said hub plates, said blades being circumferentially arranged and adapted to pick up the beet tops.

15. A machine of the class described, including a main frame, an auxiliary frame suspended from the latter, a shaft journaled in the auxiliary frame, wheels mounted upon said shaft, hub plates rigidly secured to the latter between the wheels, a series of curved blades circumferentially arranged connecting the said hub plates, a curved plate secured to the auxiliary frame in the rear of these blades, and an endless conveyer also secured to the said auxiliary frame, said conveyer being transversely disposed and located in the rear of the curved plate, and an operative connection between the said shaft and conveyer.

16. A beet harvester including ground loosening means adapted to engage the beet carried at its forward end and topping means coöperative therewith for removing the tops and foliage while the beets are still in the ground.

17. A beet harvester including ground loosening blades adapted to bear into the ground and engage the beet and top severing means coöperating therewith.

18. A beet harvester including ground loosening blades adapted to bear into the ground, means for holding said blades under yielding pressure in operative position, and top severing means located in the rear of the blades but coöperating therewith for removing the tops and foliage while the beets are still in the ground.

19. A beet harvester including top severing means adjustably carried thereon and a member adapted to loosen the ground around the beet before the top of the latter is severed.

20. A beet harvester including ground loosening blades adapted to bear into the ground, a cutting disk coöperating therewith and provided with adjustable means engaging the foliage, said cutting disk being so arranged as to perform its function with the beet still in the ground.

21. A beet harvester including ground loosening blades bearing into the ground, a revoluble cutting disk carried behind said blades and an adjustable member coöperating with the foliage to regulate the cutting action of said disk.

22. A beet harvester, including ground loosening blades adapted to bear into the ground and engage the beet and top severing means located in the rear of said blades and coöperating therewith.

23. A beet harvester including blades adapted to bear into the ground, means for applying force laterally to the said blades, and top severing means coöperating with the latter.

24. A beet harvester including blades adapted to bear into the ground and having a limited transverse movement, and top severing means coöperating with the said blades.

25. A beet harvester including a member adapted to bear into the ground and whose lower extremities have a limited degree of transverse movement, and top severing means coöperating with said member.

26. A beet harvester including top severing means adjustably carried thereon, and a member whose lower extremities have a limited degree of movement transversely and are adapted to loosen the ground around the beet before the top of the latter is severed.

In testimony whereof I affix my signature, in presence of two witnesses.

MASAO KUKY.

Witnesses:
  GRACE HUSTON,
  A. EBERT O'BRIEN.